(12) United States Patent
Xue et al.

(10) Patent No.: US 11,397,899 B2
(45) Date of Patent: Jul. 26, 2022

(54) FILTERING CONTENT USING GENERALIZED LINEAR MIXED MODELS

(71) Applicant: Microsoft Technology Licensing, LLC, Redmond, WA (US)

(72) Inventors: Huichao Xue, Santa Clara, CA (US); Girish Kathalagiri Somashekariah, Santa Clara, CA (US); Ye Yuan, Mountain View, CA (US); Varun Mithal, Sunnyvale, CA (US); Junrui Xu, Fremont, CA (US); Ada Cheuk Ying Yu, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 792 days.

(21) Appl. No.: 16/365,050

(22) Filed: Mar. 26, 2019

(65) Prior Publication Data
US 2020/0311568 A1    Oct. 1, 2020

(51) Int. Cl.
| | |
|---|---|
| *G06F 16/9535* | (2019.01) |
| *G06N 5/04* | (2006.01) |
| *G06F 16/901* | (2019.01) |
| *G06N 20/00* | (2019.01) |
| *G06F 16/9536* | (2019.01) |

(52) U.S. Cl.
CPC .......... *G06N 5/04* (2013.01); *G06F 16/9024* (2019.01); *G06F 16/9535* (2019.01); *G06F 16/9536* (2019.01); *G06N 20/00* (2019.01)

(58) Field of Classification Search
CPC ............ G06F 16/9024; G06F 16/9535; G06F 16/9536; G06F 16/24573; G06F 16/24578; G06N 5/04; G06N 5/022; G06N 20/00; G06N 20/20; G06Q 10/067; G06Q 30/0269; G06Q 30/02
See application file for complete search history.

(56) References Cited

U.S. PATENT DOCUMENTS

| | | | |
|---|---|---|---|
| 2005/0086188 A1* | 4/2005 | Hillis ..................... | G06N 5/022 706/50 |
| 2009/0187550 A1* | 7/2009 | Mowatt ............. | G06F 16/24578 707/999.005 |
| 2009/0234711 A1* | 9/2009 | Ramer ............... | G06Q 30/0269 705/14.66 |

(Continued)

*Primary Examiner* — Le H Luu
(74) *Attorney, Agent, or Firm* — Schwegman Lundberg & Woessner, P.A.

(57) ABSTRACT

In some embodiments, a computer system selects a first subset of candidate content items based on their filter scores that are generated based on a partial generalized linear mixed model comprising a baseline model and a user-based model, with the baseline model being a generalized linear model, and the user-based model being a random effects model based on user actions by the target user directed towards reference content items related to the candidate content items. In some embodiments, the computer system then selects a second subset from the first subset based on recommendation scores that are generated based on a full generalized linear mixed model comprising the baseline model, the user-based model, and an item-based model, with the item-based model being a random effects model based on user actions directed towards the candidate online content item by reference users related to the target user.

20 Claims, 12 Drawing Sheets

(56) References Cited

U.S. PATENT DOCUMENTS

| | | | |
|---|---|---|---|
| 2013/0290110 A1* | 10/2013 | LuVogt | G06Q 30/02 705/14.66 |
| 2014/0156681 A1* | 6/2014 | Lee | G06F 16/9535 707/754 |
| 2014/0280214 A1* | 9/2014 | Han | G06F 16/24575 707/748 |
| 2015/0058320 A1* | 2/2015 | Zheng | G06F 16/9535 707/722 |
| 2016/0012135 A1* | 1/2016 | Wang | G06F 16/9535 707/731 |
| 2017/0228810 A1* | 8/2017 | Shang | G06Q 10/067 |
| 2019/0370402 A1* | 12/2019 | Yang | G06F 16/9535 |
| 2020/0175043 A1* | 6/2020 | Hughes | G06F 16/24573 |
| 2020/0372386 A1* | 11/2020 | Kotolyan | G06N 20/20 |

* cited by examiner

SEARCH FOR JOBS — 520

RECOMMENDED JOBS FOR YOU

SOFTWARE QA ENGINEER — 510
ACME INC.
SAN FRANCISCO, CA
SOFTWARE QA ENGINEER TO PROVIDE SUPPORT TO UNDERSTAND USAGE MODELS AND DEVELOP TEST PLANS ...

SR. SOFTWARE ENGINEER — 510
WAYNE ENTERPRISES
PALO ALTO, CA
2+ YEARS OF EXPERIENCE IN SOA, DATA AND APPLICATION INTEGRATION, WEB SERVICES, ESB ...

SOFTWARE ENGINEER — 510
METROPOLIS CORP.
SAN MATEO, CA
THIS POSITION IS IDEAL FOR C/C++/ANDROID EXPERIENCE. WE ARE LOOKING FOR A HANDS-ON SELF-STARTER ...

SEE MORE ▽

🔍 SOFTWARE DESIGNER — 520

RESULTS FOR "SOFTWARE DESIGNER"

SENIOR SOFTWARE DESIGNER — 510
LINKEDIN
SAN FRANCISCO, CA
LOOKING FOR A HARD WORKING SENIOR SOFTWARE DESIGNER WITH A FOCUS ON BOTH INTERFACE AND VISUAL DESIGN ...

---

SR. SOFTWARE DESIGNER — 510
LUTHOR CORP.
SUNNYVALE, CA
OUTSTANDING VERBAL AND WRITTEN PRESENTATION AND FACILITATION SKILLS, WITH THE ABILITY TO ADAPT TO ...

---

SOFTWARE DESIGNER — 510
ACME INC.
SAN JOSE, CA
C#, PYTHON, AND JAVASCRIPT WITH PREFERENCE FOR ANYONE WHO ALSO HAS EXPERIENCE WITH ACTIVE DIRECTORY ...

SEE MORE ▽

710 → SENIOR SOFTWARE DESIGNER
LINKEDIN
SAN FRANCISCO BAY AREA
POSTED 2 DAYS AGO – 682 VIEWS 712  730 — [ SAVE ]   [ APPLY ] — 720

JOB DESCRIPTION
WE ARE LOOKING FOR A HARD WORKING PASSIONATE SENIOR SOFTWARE ENGINEER WITH A FOCUS ON BOTH INTERFACE AND VISUAL DESIGN. THE IDEAL CANDIDATE IS A TEAM LEADER AND HAS EXPERIENCE IN DIGITAL ENTERPISE PRODUCTS OR SOFTWARE-AS-A-SERVICE, CREATING VISUALIZATIONS, CHARTS, AND DASHBOARDS.

SENIORITY LEVEL
SENIOR

INDUSTRY
COMPUTER SOFTWARE, INFORMATION TECHNOLOGY AND SERVICES, INTERNET

EMPLOYMENT TYPE
FULL-TIME

REQUIREMENTS
- 5+ YEARS PROFESSIONAL EXPERIENCE IN WEB DESIGN
- EXPERIENCE WORKING WITH LARGE, HIGH-TRAFFIC E-COMMERCE WEBSITES
- EXPERIENCE WITH HTML/CSS AND JAVASCRIPT

SEE MORE ▽

*FIG. 7*

| USER ID | JOB ID | USER ACTION |
|---|---|---|
| 2543 | 2464 | CLICK TO VIEW |
| 2543 | 2464 | CLICK TO APPLY |
| 2543 | 2464 | IGNORE |
| 2543 | 3782 | CLICK TO SAVE |
| . . . | . . . | . . . |
| 2547 | 2464 | CLICK TO VIEW |
| 2547 | 7381 | CLICK TO SAVE |
| 2547 | 3482 | IGNORE |
| . . . | . . . | . . . |

FIG. 8

FILTERING CONTENT USING GENERALIZED LINEAR MIXED MODELS

TECHNICAL FIELD

The present application relates generally to systems, methods, and computer program products for filtering online content items for recommendation using a generalized linear mixed effects model.

BACKGROUND

Content evaluation models such as generalized linear models suffer from a lack of personalization, particularly when used in the area of information retrieval, such as generating recommendations of online content for users of an online service, resulting in the most relevant content being downgraded in favor of irrelevant content in the display area, such as in a list of recommendations on a landing page or in a list of search results. As a result, users of such an information retrieval system spend a longer time in their search for content and request a computer system to perform actions with respect to the irrelevant content, leading to excessive consumption of electronic resources, such as a wasteful use of processing power and computational expense associated with generating and displaying irrelevant content, and a wasteful use of network bandwidth associated with navigating through the irrelevant content.

Current solutions to generating recommendations of online content use a first pass ranker on a pool of candidate content items before evaluating the content items for recommendation using a main content evaluation model that generates the metrics upon which the selection of content items for recommendation are based. However, using a first pass ranker as a separate layer from the main content evaluation model results in technical problems, such as a strain on the computer system due to maintenance overhead associated with the separate layers. For example, model modification, calibration, and migration all have to be performed for both the first pass ranker and the main content evaluation model. Additionally, diagnostic simulations on the first pass ranker consume experiment bandwidth, and therefore slow down experiments on other parts of the system, such as experiments on the main content evaluation model. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 5 illustrates a graphical user interface (GUI) in which a landing page including generated recommendations is displayed, in accordance with an example embodiment.

FIG. 6 illustrates a GUI in which a search results page including generated recommendations is displayed, in accordance with an example embodiment.

FIG. 7 illustrates a GUI in which a job posting is displayed, in accordance with an example embodiment.

FIG. 8 illustrates a stored history of user actions with respect to online content items, in accordance with an example embodiment.

DETAILED DESCRIPTION

I. Overview

Figure 1:
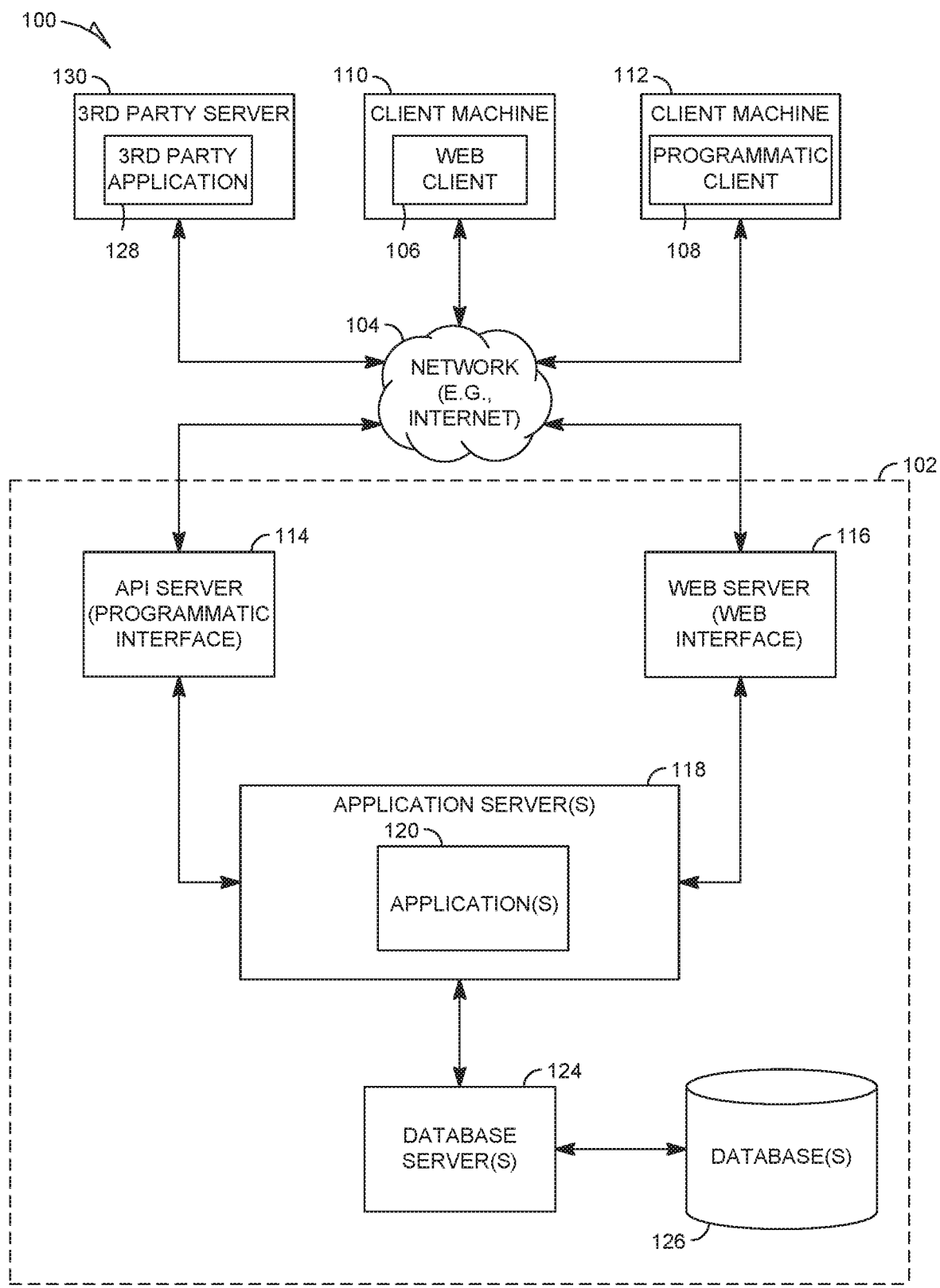
FIG. 1 is a block diagram illustrating a client-server system, in accordance with an example embodiment.

Example methods and systems of generating recommendations for online content items using a partial generalized linear mixed model and a fill generalized linear mixed model are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein, which provide a system and method for generating recommendations of online content items for a target user using a partial generalized linear mixed model in place of a first pass ranker and a full generalized linear mixed model as the main content evaluation model. In some example embodiments, a computer system selects a first subset of candidate content items based on their filter scores that are generated based on the partial generalized linear mixed model, which comprises a baseline model and a user-based model. The baseline model is a generalized linear model, and the user-based model is a random effects model based on user actions by the target user directed towards reference content items related to the candidate content items. The computer system then selects a second subset from the first subset based on recommendation scores that are generated based on the full generalized linear mixed model, which comprises the baseline model, the user-based model, and an item-based model. The item-based model is a random effects model based on user actions directed towards the candidate online content item by reference users related to the target user. The selected second subset of candidate online content items are displayed on a computing device of the target user.

The implementation of the features disclosed herein involves a non-generic, unconventional, and non-routine operation or combination of operations. By applying one or more of the solutions disclosed herein, some technical effects of the system and method of the present disclosure are to provide a specially configured computer system that avoids excessive consumption of electronic resources, conserving processing power, computational expense, and network bandwidth by using specially-configured generalized linear mixed models to generate the most relevant online content item recommendations for a target user, as well as to reduce and minimize the amount of maintenance overhead. As a result, the functioning of the computer system is improved. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
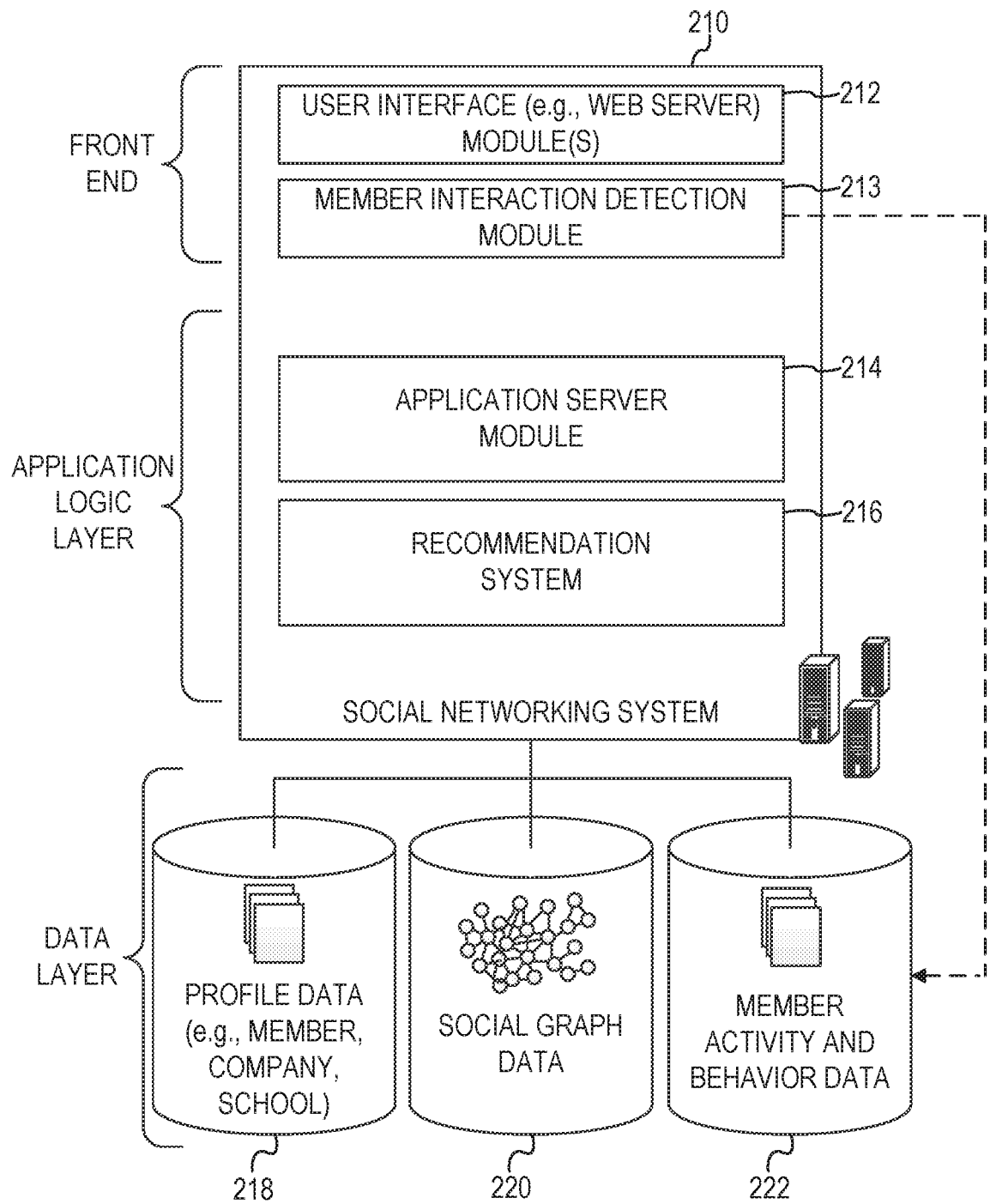
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a recommendation system 216, for use in social networking system 210, consistent with some embodiments of the present disclosure. In some embodiments, the recommendation system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the recommendation system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to inter or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in NG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the recommendation system 216. The members' interactions and behavior may also be tracked, stored, and used by the recommendation system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the recommendation system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
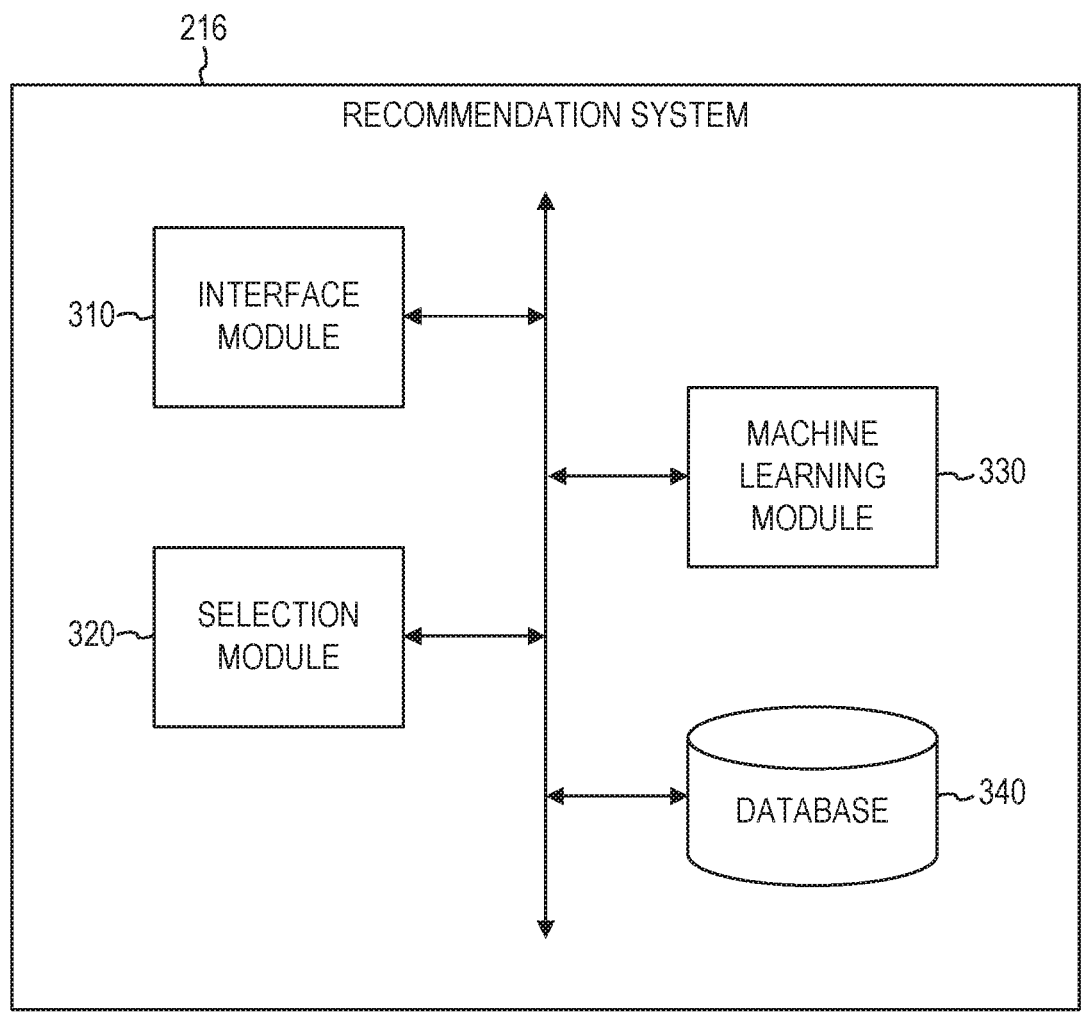
FIG. 3 is a block diagram illustrating a recommendation system, in accordance with an example embodiment.

FIG. 3 is a block diagram illustrating components of the recommendation system 216, in accordance with an example embodiment. In some embodiments, the recommendation system 216 comprises any combination of one or more of an interface module 310, a selection module 320, a machine learning module 330, and one or more database(s) 340. The modules 310, 320, and 330, and the database(s) 340 can reside on a computer system, or other machine, having a memory and at least one processor (not shown). In some embodiments, the modules 310, 320, and 330, and the database(s) 340 can be incorporated into the application server(s) 118 in FIG. 1. In some example embodiments, the database(s) 340 is incorporated into database(s) 126 in FIG. 1 and can include any combination of one or more of databases 218, 220, and 222 in FIG. 2. However, it is contemplated that other configurations of the modules 310, 320, and 330, and the database(s) 340, are also within the scope of the present disclosure.

In some example embodiments, one or more of the modules 310, 320, and 330 is configured to provide a variety of user interface functionality, such as generating one or more user interfaces described herein, which include non-routine and unconventional aspects or combinations of aspects, interactively presenting those user interfaces to the user, receiving information from the user (e.g., interactions with those user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, and 330 is configured to receive user input. For example, one or more of the modules 310, 320, and 330 can present one or more GUI elements (e.g., drop-down menu, selectable buttons, text field) with which a user can submit input.

In some example embodiments, one or more of the modules 310, 320, and 330 is configured to perform various communication functions to facilitate the functionality described herein, such as by communicating with the social networking system 210 via the network 104 using a wired or wireless connection Any combination of one or more of the modules 310, 320, and 330 may also provide various web services or functions, such as retrieving information from the third party servers 130 and the social networking system 210. Information retrieved by the any of the modules 310, 320, and 330 may include profile data corresponding to users and members of the social networking service of the social networking system 210.

Additionally, any combination of one or more of the modules 310, 320, and 330 can provide various data functionality, such as exchanging information with database(s) 340 or servers. For example, any of the modules 310, 320, and 330 can access member profiles that include profile data from the database(s) 340, as well as extract attributes and/or characteristics from the profile data of member profiles. Furthermore, the one or more of the modules 310, 320, and 330 can access social graph data and member activity and behavior data from database(s) 340, as well as exchange information with third party servers 130, client machines 110, 112, and other sources of information.

In some example embodiments, the interface module 310 is configured to detect activity by a target user on, or otherwise directed to, a page of an online service (e.g., a page of the social networking system 210). For example, the interface module 310 may detect when the target user visits or otherwise accesses a page of an online service, such as a home page or a landing page of an online service. The interface module 310 may also detect when the target user submits a search query, such as when the target user submits one or more search terms to be used in a search for online job postings via the online service. In some example embodiments, the detection by the interface module 310 of activity by the target user on a page of an online service acts triggers the performance of the operations of the selection module 320 disclosed herein. However, it is contemplated that the operations of the selection module 320 disclosed herein may also be triggered independently of the detection by the interface module 310 of activity by the target user.

In some example embodiments, the selection module 320 is configured to select online content items for recommendation to the target user. The term "target" is used herein in association with the term "user" to identify that specific user as the one for which the recommendations of online content items are being generated. In some example embodiments, the online content items comprise job postings. Current systems for recommending job postings overly recommend popular job postings, such that many users are provided recommendations for job postings that are far off from the roles of the user or that are otherwise irrelevant to the users. For example, a director of product marketing may be recommended many Java engineer jobs. One commonality among these job recommendations is that these current systems tend to choose popular job postings that have been posted a few days earlier.

The generalized linear mixed models of the present disclosure include one or more non-routine and unconventional operations or combinations of operations that provide an improvement on generalized linear models and improve the relevance of recommendations. In addition to linear or logistic regression on overall data, the generalized linear mixed models of the present disclosure add new entity-level regression models to a generalized linear model, which introduces personalization for entities. In cases where data is abundant, such as in use cases where a user is searching for job postings, the generalized linear mixed models of the present disclosure provide a significant improvement in relevance of search results, as they can be used to build predictive entity-level models for entity personalization.

In some example embodiments, the generalized linear mixed models of the present disclosure use model variants to improve search relevance. For example, given historical queries in search situations, user/job features, and the jobs in the search results that have user actions directed towards them, such as clicks to view, a ranking model may be built to list the most relevant job postings in search results for future queries. In order to add entity-centralized personalization to these models, generalized linear mixed models including a generalized linear query-based model and one or more random effects models for different entities, including user (e.g., member of an online service) and online content item (e.g., job posting) may be used.

However, the use of generalized linear mixed models may still result in irrelevant recommendations. One cause of this remaining problem of irrelevant recommendations, particularly in the area of job posting recommendations, is that certain computer systems that use generalized linear mixed models customize their recommendations on every user and every job posting, which unfortunately can introduce avalanche effects. That is, if it the model has a bias on a job posting, the model will enlarge the bias after retraining and re-collecting data every day. In one example, on day one, 10 java engineers applied for a job posting. The job posting will then be recommended to 100 java engineers the next day, and 1000 the day after, and so on and so forth. This effect is especially prevalent within the model's per-job component, which memorizes for every job the types of user it attracts. Besides that, the model also has a global component and a per-user component, which learns the overall trend and personalized trends accordingly. For mismatching job postings, the per-job component of the model is identified to be the top contributor, compared to the other two components.

One way to address this deficiency is via a separate ranking layer, such as a first pass ranker. However, as previously discussed, having a first pass ranker as a separate layer from the main evaluation model incurs overhead onto the computer system. In some example embodiments, the computer system uses a partial generalized linear mixed model having the global and per-user components to pre-select online content items (e.g., job postings) based on users' preferences, thereby substituting the partial generalized linear mixed model in place of a first pass ranker, and then using the full generalized linear mixed model to select online content items from the pre-selected online content items. As a result, the maintenance of this pre-selection model is lighter-weight, as it merges into the maintenance of the main content evaluation model, since it is based on a portion of the main content evaluation model. Additionally, substituting the partial generalized linear mixed model in place of a first pass ranker incurs minimum maintenance overhead. For example, by adding features into the full generalized linear mixed model will automatically upgrade the partial generalized linear mixed model, as they share model components, and the ramping of the partial generalized linear mixed model is naturally bundled with the full generalized linear mixed model, therefore requiring no additional experiment bandwidth.

Figure 4:
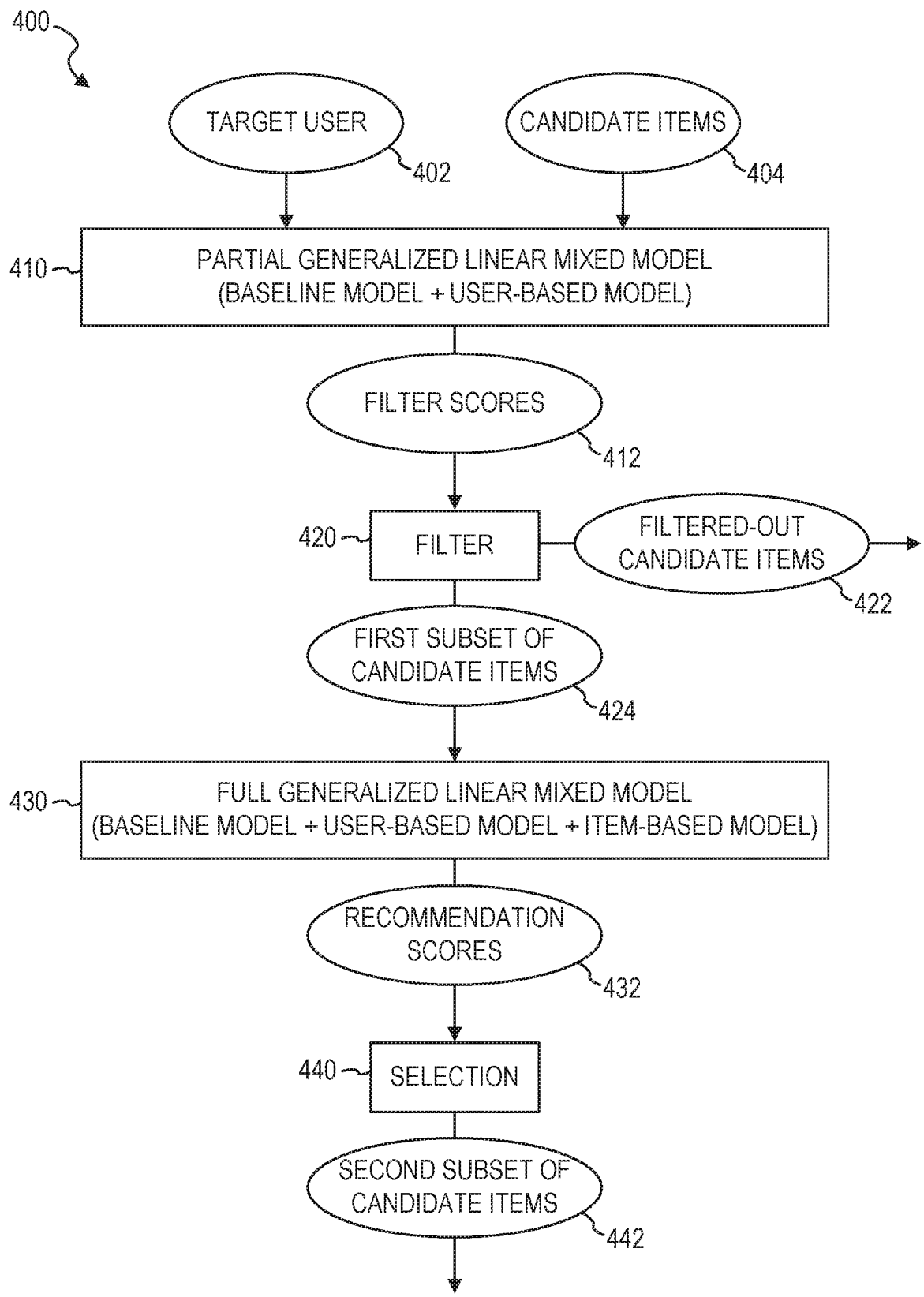
FIG. 4 illustrates a conceptual flow of generating recommendations using a partial generalized linear mixed model and a full generalized linear mixed model, in accordance with an example embodiment.

In some example embodiments, the selection module 320 is configured to generate recommendations for online content items using a partial generalized linear mixed model as a pre-selection model and a full generalized linear mixed model as a main content evaluation model. FIG. 4 illustrates a conceptual flow 400 of generating recommendations using a partial generalized linear mixed model and a fill generalized linear mixed model, in accordance with an example embodiment. In some example embodiments, the selection module 320 is configured to perform the operations disclosed in the conceptual flow 400 of FIG. 4.

In the example embodiment of FIG. 4, given a target user 402 and a plurality of candidate online content items 404, the selection module 320 generates corresponding filter scores 412 for the plurality of candidate online content items 404 based on a partial generalized linear mixed model 410 that comprises a baseline model (e.g., a global model) and a user-based model. In some example embodiments, the plurality of candidate online content items comprises online job postings. However, other types of candidate online content items are also within the scope of the present disclosure.

In some example embodiments, the baseline model is a fixed effects model. A fixed effects model is a statistical model in which the model parameters are fixed or non-random quantities. A fixed effects model may comprise a regression model in which the group means are fixed (non-random) as opposed to a random effects model in which the group means are a random sample from a population. Generally, data can be grouped according to several observed factors. The group means could be modeled as fixed or random effects for each grouping. In a fixed effects model, each group mean is a group-specific fixed quantity.

In some example embodiments, the baseline model is a generalized linear model based on feature data of the candidate online content items. A generalized linear model is a flexible generalization of ordinary linear regression that allows for response variables that have error distribution models other than a normal distribution. The generalized linear model generalizes linear regression by allowing the linear model to be related to the response variable via a link function and by allowing the magnitude of the variance of each measurement to be a function of its predicted value.

In some example embodiments, the feature data of the candidate online content items comprises one or more of at least one skill, at least one interest, at least one industry, at least one employment history data, and at least one educational background data (e.g., skills listed in a job posting). However, other types of feature data are also within the scope of the present disclosure. The feature data may be stored in and accessed by the selection module 320 from the database 340.

In some example embodiments, the generalized linear model of the baseline model is further based on a comparison of profile information of the target user with the feature data of the candidate online content items. Such configuration of the generalized linear model may be used in use cases where recommendations for online content items are being generated for display on a landing page of an online service or in an electronic message from the online service to the target user (e.g., a text message or an e-mail). In some example embodiments, the profile information comprises one or more of at least one of skill, at least one interest, at least one industry, at least one employment history data, and at least one educational background data. However, other types of profile information are also within the scope of the present disclosure, including, but not limited to, any profile data stored in the database 218 in FIG. 2. In some example embodiments, the scoring module 320 is configured to extract profile information from a profile of the target user stored in the database 218.

In some example embodiments, the generalized linear model of the baseline model is further based on a comparison of a search query received from the target user with the feature data of the candidate online content item. Such configuration of the generalized linear model may be used in use cases where recommendations for online content items are being generated for display as part of search results in response to the search query.

In some example embodiments, the user-based model of the partial generalized linear mixed model is a random effects model based on a history of online user actions by the target user directed towards reference online content items having feature data determined to be related to the feature data of the online candidate content items. A random effects model, also called a variance components model, is a statistical model where the model parameters are random variables. The random effects model is a kind of hierarchical linear model, which assumes that the data being analyzed are drawn from a hierarchy of different populations whose differences relate to that hierarchy. In some example embodiments, the online user actions directed towards the reference online content items comprise at least one of selecting a user interface element indicating an interest by the target user in viewing the reference online content items, selecting a user interface element indicating an interest by the target user in saving the reference online content items, and selecting a user interface element indicating an interest by the target user in sending a message corresponding to the reference online content items. It is contemplated that other types of online user actions are also within the scope of the present disclosure. The history of online user actions may be stored in and accessed by the selection module 320 from the database 222 in FIG. 2.

Referring back to FIG. 4, the selection module 320 performs a filter operation 420 to filter out a portion of the candidate online content items 422 in selecting a first subset of candidate online content items 424 from the plurality of candidate online content items based on the corresponding filter scores 412. In some example embodiments, the selection of the first subset by the selection module 320 comprises one or more of the selection module 320 applying a threshold value for the filter scores 412 of the candidate online content items 404 to satisfy in order for the candidate online content items 404 to be included in the first subset 424 and the selection module 320 selecting the first subset 424 based on a ranking of the candidate online content items 404 based on their filter scores 412. However, it is contemplated that the selection module 320 may select the first subset in other ways as well.

In some example embodiments, the selection module 320 uses the combination of the threshold value and the ranking to select the first subset of candidate online content items 424. For example, the selection module 320 may first select a portion of the plurality of candidate online content items 404 based on the corresponding filter scores 412 of the portion of the plurality of candidate online content items 404 satisfying the threshold value. For example, the selection module 320 may select only the portion of the plurality of candidate online content items 404 that have a corresponding filter score 412 at or above a threshold value of 50. However, it is contemplated that other threshold values are also within the scope of the present disclosure. The selection module 320 may then rank the selected portion of the plurality of candidate online content items based on their corresponding filter scores 412. For example, the selection module 320 may rank the selected portion of the plurality of candidate online content items in descending or ascending order of their corresponding filter scores 412. Finally, the selection module 320 may then select the first subset 424 from the selected portion of the plurality of candidate online content items based on the ranking of the selected portion of the plurality of candidate online content items. For example, the selection module 320 may select the top N-ranked candidate online content items, where N is a positive integer or a positive percentage (e.g., the top 10 candidate online content items in the ranking or the top 10% of the candidate online content items in the ranking).

In some example embodiments, the selection module 320 generates corresponding recommendation scores 432 for the candidate online content items in the first subset 424 based on a full generalized linear mixed model 430 that comprises the baseline model and the user-based model of the partial generalized linear mixed model 410, as well as an item-based model. In some example embodiments, the item-based model is a random effects model based on a history of online user actions directed towards the candidate online content items by a plurality of reference users having profile information determined to be related to the profile information of the target user. The online user actions directed towards the candidate online content item may comprise at least one of selecting a user interface element indicating an interest by the reference users in viewing the candidate online content item, selecting a user interface element indicating an interest by the reference users in saving the candidate online content item, and selecting a user interface element indicating an interest by the target user in sending a message corresponding to the reference online content item. It is contemplated that other types of online user actions are also within the scope of the present disclosure. The history of online user actions may be stored in and accessed by the selection module 320 from the database 222 in FIG. 2.

In some example embodiments, the selection module 320 leverages the calculations made using the partial generalized linear mixed model 410 for the filter scores 412 when calculating the recommendation scores 432 using the full generalized linear mixed model 420. For example, the selection module 320 may generate the filter score 412 by generating a baseline score using the baseline model and a user-based score using the user-based model, and then aggregate the baseline score and the user-based score to form the filter score 412. Subsequently, when generating the recommendation scores 432, the selection module 320 may use the already-calculated baseline scores and the user-based scores from the generation of the filter scores 412 and add them to newly-calculated item-based scores of the full generalized linear mixed model 430 to form the recommendation scores 432, rather than recalculating the baseline scores and the user-based scores for the recommendation scores 432. However, recalculation of the baseline scores and the user-based scores by the selection module 320 along with the calculation of the item-based score in generating the recommendation scores 432 is also within the scope of the present disclosure.

In some example embodiments, the selection module 320 performs a selection operation 440 to select a second subset of candidate online content items 442 from the first subset 424 based on the corresponding recommendation scores 432 of the second subset 442. In some example embodiments, the selection module 320 selects the second subset 442 based on a ranking of the first subset 424 based on their recommendation scores 432, such as by selecting the top N-ranked candidate online content items, where N is a positive integer or a positive percentage. However, it is contemplated that the recommendation system 216 may select the second subset in other ways as well.

In some example embodiments, the interface module 310 is configured to cause the second subset of candidate online content items 442 to be displayed on a computing device of the target user. In some example embodiments, the causing the second subset of candidate online content items 442 to be displayed comprises causing the second subset 442 to be displayed via at least one communication channel from a group of communication channels consisting of a personalized data feed for the target user, a listing of search results on a search results page of an online service, and an e-mail transmitted to the target user. However, it is contemplated that other communication channels and other ways of causing the second subset to be displayed are also within the scope of the present disclosure.

FIG. 5 illustrates a graphical user interface (GUI) 500 in which a landing page including generated recommendations 510 is displayed, in accordance with an example embodiment. The recommendations 510 comprise selectable user interface elements (e.g., hyperlinked text) for each one of the selected subset of online content items. Each recommendation 510 may include information about the corresponding online content item. For example, in embodiments where the online content items comprise job postings, the recommendations 510 may include information including, but not limited to, a job title, a company name, a geographical location, and desired skills, educational background, and work experience. Other types of information may also be included in the recommendation 510.

Each selectable user interface element of the recommendation 510 may be configured to trigger an interaction event between the user selecting the user interface element and the online content item corresponding to the selected user interface element. For example, selection of one of the selectable user interface elements may trigger a display of the additional information of the online content item, such as the display of a page on which the target user may submit an application to a job posting.

The GUI 500 may also display one or more user interface elements 520 configured to enable the user to submit a search query for searching for online courses, such as by entering keyword search terms into a search field. FIG. 6 illustrates a GUI 600 in which a search results page including generated recommendations 510 is displayed, in accordance with an example embodiment. The recommendations 510 may include the same features as the recommendations 510 in FIG. 5, including information about the corresponding online content item and comprising a selectable user interface element configured to trigger an interaction event between the target user selecting the user interface element and the online content item corresponding to the selected user interface element. In the example shown in FIG. 6, the user has submitted a search query "SOFTWARE DESIGNER" via search field 520, and the recommendation system 216 has generated search results made up of recommended relevant online job postings related to the search query "SOFTWARE DESIGNER." The recommendations 510 displayed in FIG. 5 and the recommendations 510 displayed in FIG. 6 may be displayed in an order that is based on the corresponding scores of their corresponding online content items. For example, the higher the score of an online content item, the more priority the recommendation 510 of the corresponding online content item may be given in its display, such as being displayed in a higher position than recommendations 510 of online content items having lower scores.

FIG. 7 illustrates a GUI 700 in which a job posting is displayed, in accordance with an example embodiment. In FIG. 7, the job posting comprises headline information 710 and detailed information 712. The headline information 710 comprises basic information about the job posting, such as the job title or position (e.g., "SENIOR SOFTWARE DESIGNER"), the name of the company or organization seeking applicants for the job title or position (e.g., "LINKEDIN"), and the location of the job (e.g., "SAN FRANCISCO BAY AREA"). The detailed information 712 comprises more detailed information about the job, including, but not limited to, a job description, a seniority level of the job, one or more industries to which the job corresponds, an employment type for the job, and requirements for the job.

In FIG. 7, the GUI 700 also comprises a selectable user interface element 720 configured to enable a user who is viewing the job posting to submit a job application for the job posting. In some example embodiments, the selectable user interface element 720 comprises a selectable button or link (e.g., the selectable "APPLY" button in FIG. 7) that is configured to, when selected, trigger the interface module 310 to display another GUI in which the user can submit an application for the job posting. The GUI 700 also comprises a selectable user interface element 730 configured to enable the user who is viewing the job posting to save the job posting for subsequent viewing, such as by saving a reference to the job posting in association with an account of the user, such that the user may access the reference to trigger another display of the job posting.

Referring back to FIG. 3, in some example embodiments, the machine learning module 330 is configured to receive an indication of a selection by the target user of a corresponding selectable user interface element for at least one of the second subset of candidate online content items that are displayed as recommendations. For example, the machine learning module 330 may receive an indication of the target user selecting a user interface element configured to trigger a display of additional detail of one of the second subset of candidate online content items (e.g., to view additional detail of a job posting), an indication of the target user selecting a user interface element configured to trigger a saving of one of the second subset of candidate online content items (e.g., to save a job posting), or an indication of the target user selecting a user interface element configured to trigger a sending of a message corresponding to one of the second subset of candidate online content items (e.g., a message including the target user applying for a job posting). However, it is contemplated that other types of indications are also within the scope of the present disclosure.

In some example embodiments, the machine learning module 330 stores the indication of the selection by the target user of the corresponding selectable user interface element in a database of an online service. For example, the machine learning module 330 may store the indication of the selection by the target user in the database 340, or the database 222 of FIG. 2, along with other stored indications of user selections and behavior.

In some example embodiments, the machine learning module 330 uses a machine learning algorithm to modify at least one of the baseline model, the user-based model, and the item-based model based on the stored indications of the selections by the target user of the selectable user interface elements. For example, the machine learning module 330 may use the stored indications as training data in re-training at least one of the baseline model, the user-based model, and the item-based model using the machine learning algorithm. The modified model(s) may then be used for generating recommendations.

FIG. 8 illustrates a stored history 800 of user actions with respect to online content items, in accordance with an example embodiment. In some example embodiments, the stored history 800 comprises indications of online content items, such as job postings, each user has engaged with via a user action, and the different types of user actions the user has used to engage the online content item. For example, the stored history 800 may comprise a record of each interaction a user associated with user ID 2543 has had with any job posting, with the job postings being represented by a job identification (ID) in the stored history 800. This stored history 800 may be stored in the database(s) 340 and retrieved by the selection module 320 when using the generalized linear mixed models to generate the filter scores and the recommendation scores for the candidate job postings or other candidate online content items.

Figure 9:
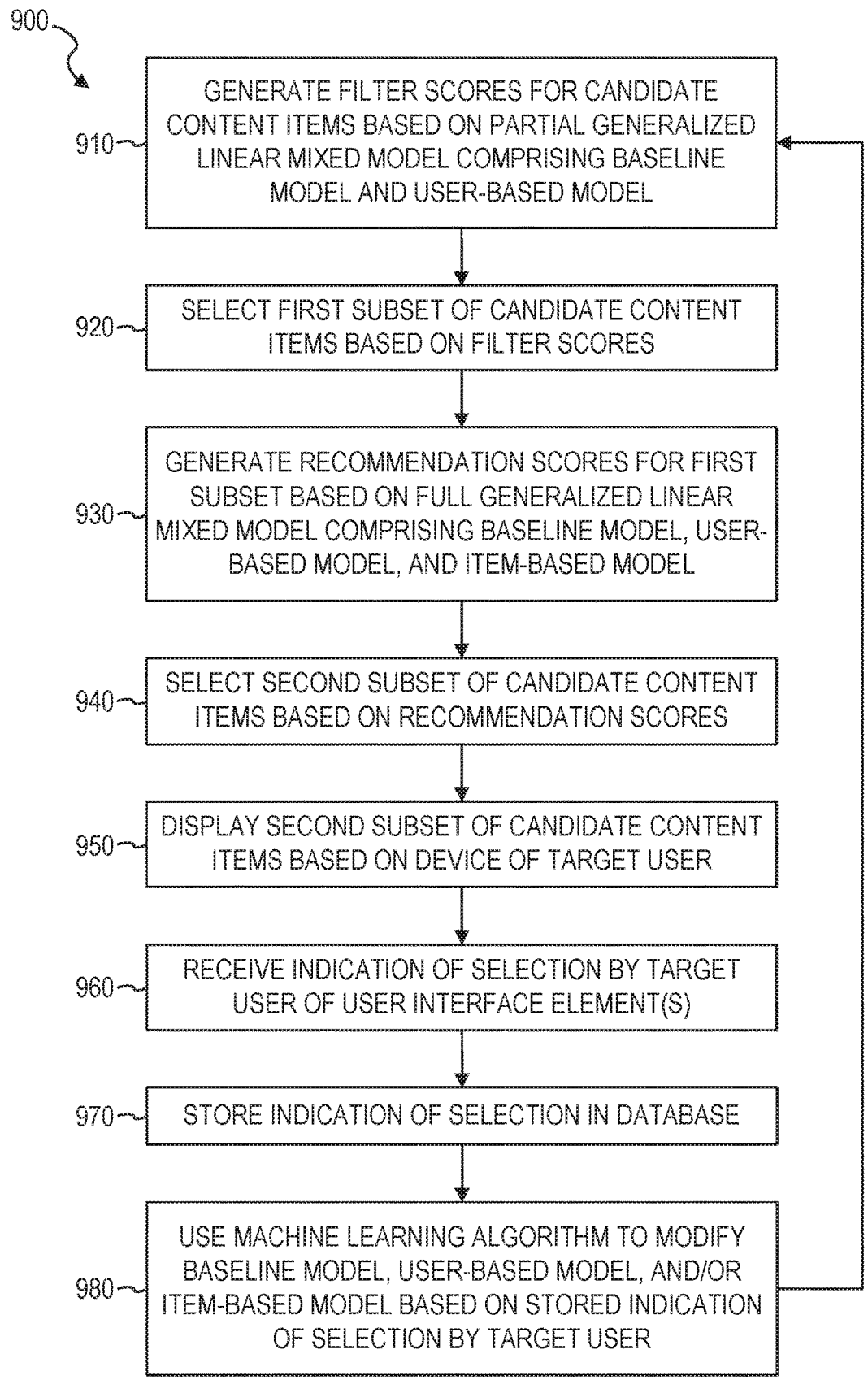
FIG. 9 is a flowchart illustrating a method of generating recommendations of online content items, in accordance with an example embodiment.

FIG. 9 is a flowchart illustrating a method 900 of generating recommendations of online content items, in accordance with an example embodiment. The method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the recommendation system 216 of FIGS. 2-3, or any combination of one or more of its modules, as described above.

At operation 910, the recommendation system 216 generates a corresponding filter score for each one of a plurality of candidate online content items based on a partial generalized linear mixed model that comprises a baseline model and a user-based model. In some example embodiments, the plurality of candidate online content items comprise online job postings. However, other types of candidate online content items are also within the scope of the present disclosure. In some example embodiments, the baseline model is a fixed effects model. In some example embodiments, the baseline model is a generalized linear model based on feature data of the candidate online content items, and the user-based model is a random effects model based on a history of online user actions by the target user directed towards reference online content items having feature data determined to be related to the feature data of the online candidate content items.

In some example embodiments, the generalized linear model of the baseline model is further based on a comparison of profile information of the target user with the feature data of the candidate online content item. In some example embodiments, the profile information comprises one or more of at least one of skill, at least one interest, at least one industry, at least one employment history data, and at least one educational background data. However, other types of profile information are also within the scope of the present disclosure. In some example embodiments, the feature data comprises one or more of at least one skill, at least one interest, at least one industry, at least one employment history data, and at least one educational background data. However, the other types of feature data are also within the scope of the present disclosure. In some example embodiments, the generalized linear model of the baseline model is further based on a comparison of a search query received from the target user with the feature data of the candidate online content item.

At operation 920, the recommendation system 216 selects a first subset of candidate online content items from the plurality of candidate online content items based on the corresponding filter scores of the first subset. In some example embodiments, the selection of the first subset by the recommendation system 216 comprises one or more of the recommendations system 216 applying a threshold value for the filter scores of the candidate online content items to satisfy in order for the candidate online content items to be included in the first subset and the recommendation system 216 selecting the first subset based on a ranking of the candidate online content items based on their filter scores.

However, it is contemplated that the recommendation system 216 may select the first subset in other ways as well.

At operation 930, the recommendation system 216 generates a corresponding recommendation score for each one of the candidate online content items in the first subset based on a full generalized linear mixed model that comprises the baseline model, the user-based model, and an item-based model. In some example embodiments, the item-based model is a random effects model based on a history of online user actions directed towards the candidate online content items by a plurality of reference users having profile information determined to be related to the profile information of the target user.

At operation 940, the recommendation system 216 selects a second subset of candidate online content items from the first subset based on the corresponding recommendation scores of the second subset. In some example embodiments, the recommendation system 216 selects the second subset of candidate online content items based on a ranking of the first subset of candidate online content items based on their recommendation scores, such as by selecting the top N-ranked candidate online content items, where N is a positive integer. However, it is contemplated that the recommendation system 216 may select the second subset in other ways as well.

At operation 950, the recommendation system 216 causes the second subset of candidate online content items to be displayed on a computing device of the target user. In some example embodiments, the causing the second subset of candidate online content items to be displayed comprises causing the second subset of candidate online content items to be displayed via at least one communication channel from a group of communication channels consisting of a personalized data teed for the target user a listing of search results on a search results page of an online service, and an e-mail transmitted to the target user. However, it is contemplated that other communication channels and other ways of causing the second subset to be displayed are also within the scope of the present disclosure.

At operation 960, the recommendation system 216 receives an indication of a selection by the target user of a corresponding selectable user interface element for at least one of the second subset of candidate online content items. For example, the recommendation system 216 may receive an indication of the target user selecting a user interface element configured to trigger a display of additional detail of one of the second subset of candidate online content items (e.g., to view additional detail of a job posting), an indication of the target user selecting a user interface element configured to trigger a saving of one of the second subset of candidate online content items (e.g., to save a job posting), or an indication of the target user selecting a user interface element configured to trigger a sending of a message corresponding to one of the second subset of candidate online content items (e.g., a message including the target user applying for a job posting). However, it is contemplated that other types of indications are also within the scope of the present disclosure.

At operation 970, the recommendation system 216 stores the indication of the selection by the target user of the corresponding selectable user interface element in a database of an online service. For example, the recommendation system 216 may store the indication of the selection by the target user in the database 340 along with other stored indications of user selections.

At operation 980, the recommendation system 216 uses a machine learning algorithm to modify at least one of the baseline model, the user-based model, and the item-based model based on the stored indication of the selection by the target user of the corresponding selectable user interface element. For example, the recommendation system 216 may use the stored indication as training data in re-training at least one of the baseline model, the user-based model, and the item-based model using the machine learning algorithm. The method 900 may then return to operation 910, where the modified model(s) may be used in the method 900 for generating recommendations.

It is contemplated that any of the other features described within the present disclosure can be incorporated into the method 900.

Figure 10:
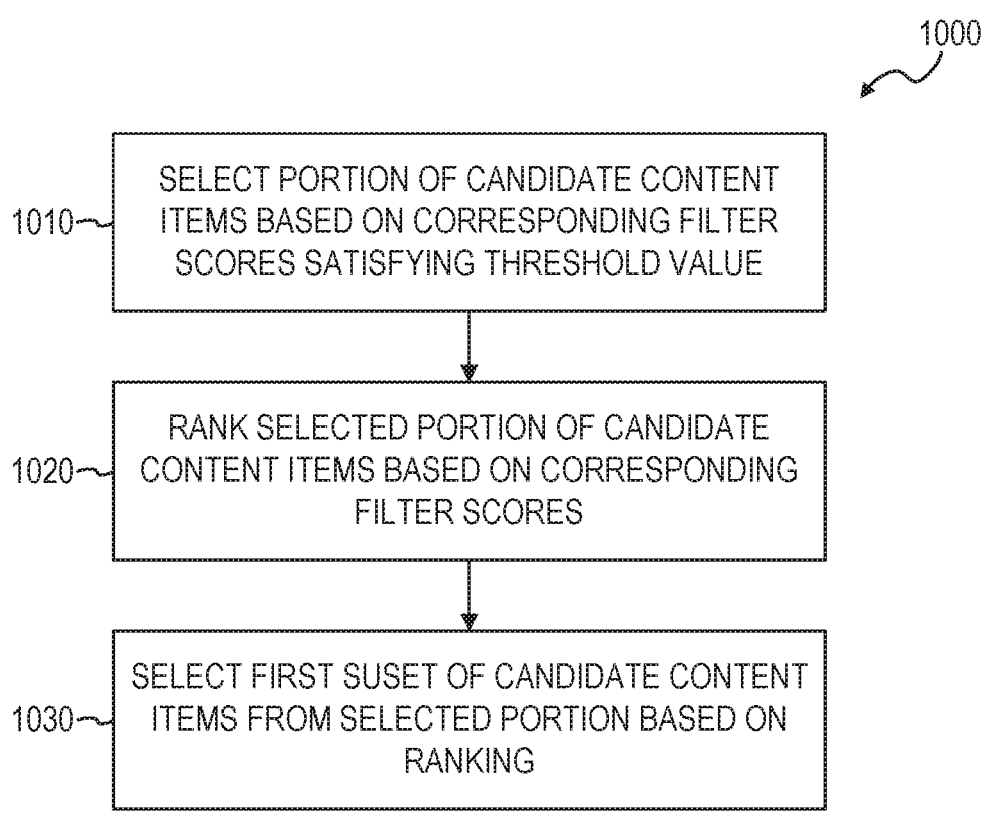
FIG. 10 is a flowchart illustrating a method of selecting a subset of candidate online content items based on their filter scores, in accordance with an example embodiment.

FIG. 10 is a flowchart illustrating a method 1000 of selecting a subset of candidate online content items based on their filter scores, in accordance with an example embodiment. The method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the recommendation system 216 of FIGS. 2-3, or any combination of one or more of its modules, as described above.

In some example embodiments, the method 1000 comprises operations 1010, 1020, and 1030, which are performed as part of operation 920 in the method 900 of FIG. 9. Accordingly, operations 1010, 1020, and 1030 of FIG. 10 may be used to select the first subset of candidate online content items following the generation of the filter scores for the first subset of candidate online content items at operation 910 of the method 900 of FIG. 9.

At operation 1010, the recommendation system 216 selects a portion of the plurality of candidate online content items based on the corresponding filter scores of the portion of the plurality of candidate online content items satisfying a threshold value. For example, the recommendation system 216 may select only the portion of the plurality of candidate online content items that have a corresponding filter score at or above a threshold value of 50. However, it is contemplated that other threshold values are also within the scope of the present disclosure.

At operation 1020, the recommendation system 216 ranks the selected portion of the plurality of candidate online content items based on their corresponding filter scores. For example, the recommendation system 216 may rank the selected portion of the plurality of candidate online content items in descending or ascending order of their corresponding filter scores.

At operation 1030, the recommendation system 216 selects the first subset of candidate online content items from the selected portion of the plurality of candidate online content items based on the ranking of the selected portion of the plurality of candidate online content items. For example, the recommendation system 216 may select the top N-ranked candidate online content items, where N is a positive integer or a positive percentage (e.g., the top 10 candidate online content items in the ranking or the top 10% of the candidate online content items in the ranking).

It is contemplated that any of the other features described within the present disclosure can be incorporated into the method 1000.

Figure 11:
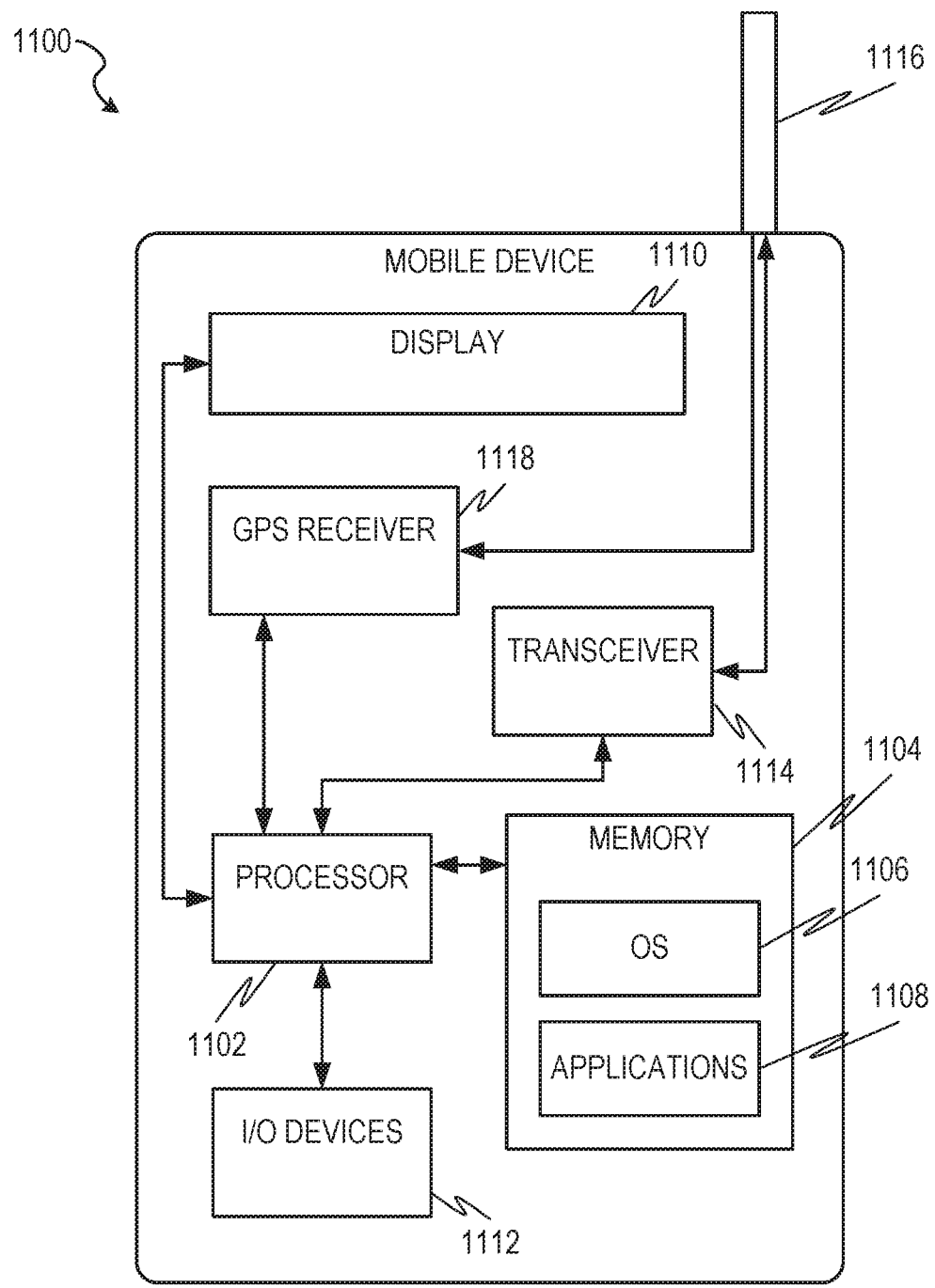
FIG. 11 is a block diagram illustrating a mobile device, in accordance with some example embodiments.

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100

(for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as application programs 1108, such as a mobile location-enabled application that can provide location-based services (LBSs) to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 12:
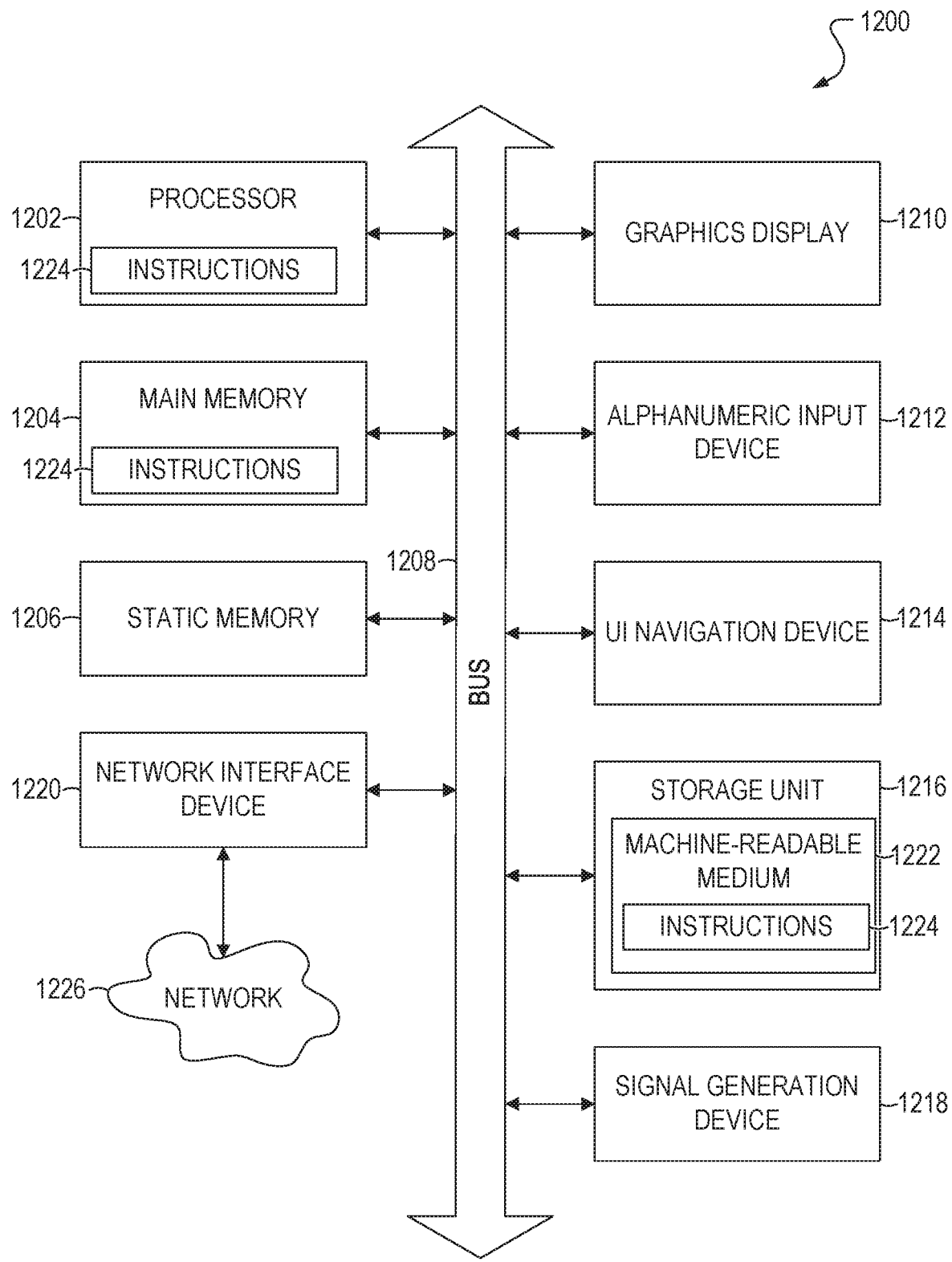
FIG. 12 is a block diagram of an example computer system on which methodologies described herein may be executed, in accordance with an example embodiment.

FIG. 12 is a block diagram of an example computer system 1200 on which methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a graphics display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a storage unit 1216, a signal generation device 1218 (e.g., a speaker) and a network interface device 1220.

The storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media a centralized or distributed database, and/or associated caches and servers) that store the one or more instructions 1224 or data structures. The term "machine-readable medium" shall also be taken to include any tangible medium that is capable of storing, encoding or carrying instructions (e.g., instructions 1224) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following numbered examples are embodiments.

1. A computer-implemented method comprising:
for each one of a plurality of candidate online content items, generating, by a computer system having a memory and at least one hardware processor, a corresponding filter score based on a partial generalized linear mixed model comprising a baseline model and a user-based model, the baseline model being a generalized linear model based on feature data of the candidate online content item, the user-based model being a random effects model based on a history of online user actions by the target user directed towards reference online content items having feature data determined to be related to the feature data of the online candidate content items;
selecting, by the computer system, a first subset of candidate online content items from the plurality of candidate online content items based on the corresponding filter scores of the first subset;
for each one of the candidate online content items in the first subset, generating, by the computer system, a corresponding recommendation score based on a full generalized linear mixed model comprising the baseline model, the user-based model, and an item-based model, the item-based model being a random effects model based on a history of online user actions directed towards the candidate online content item by a plurality of reference users having profile information determined to be related to profile information of the target user;

selecting, by the computer system, a second subset of candidate online content items from the first subset based on the corresponding recommendation scores of the second subset; and causing, by the computer system, the second subset of candidate online content items to be displayed on a computing device of the target user.

2. The computer-implemented method of example 1, wherein the plurality of candidate online content items comprises online job postings.

3. The computer-implemented method of example 1 or example 2, wherein the baseline model is a fixed effects model.

4. The computer-implemented method of any one of examples 1 to 3, wherein the generalized linear model of the baseline model is further based on a comparison of profile information of the target user with the feature data of the candidate online content item.

5. The computer-implemented method of any one of examples 1 to 4, wherein the generalized linear model of the baseline model is further based on a comparison of a search query received from the target user with the feature data of the candidate online content item.

6. The computer-implemented method of any one of examples 1 to 5, wherein the profile information comprises one or more of at least one of skill, at least one interest, at least one industry, at least one employment history data, and at least one educational background data.

7. The computer-implemented method of any one of examples 1 to 6, wherein the feature data comprises one or more of at least one skill, at least one interest, at least one industry, at least one employment history data, and at least one educational background data.

8. The computer-implemented method of any one of examples 1 to 7, wherein:
the online user actions directed towards the reference online content items comprises at least one of selecting a user interface element indicating an interest by the target user in viewing the reference online content items, selecting a user interface element indicating an interest by the target user in saving the reference online content items, and selecting a user interface element indicating an interest by the target user in sending a message corresponding to the reference online content items; and
the online user actions directed towards the candidate online content item comprises at least one of selecting a user interface element indicating an interest by the reference users in viewing the candidate online content item, selecting a user interface element indicating an interest by the reference users in saving the candidate online content item, and selecting a user interface element indicating an interest by the target user in sending a message corresponding to the reference online content item.

9. The computer-implemented method of any one of examples 1 to 8, wherein the selecting the first subset of candidate online content items comprises:
selecting a portion of the plurality of candidate online content items based on the corresponding filter scores of the portion of the plurality of candidate online content items satisfying a threshold value;
ranking the selected portion of the plurality of candidate online content items based on their corresponding filter scores; and
selecting the first subset of candidate online content items from the selected portion of the plurality of candidate online content items based on the ranking of the selected portion of the plurality of candidate online content items.

10. The computer-implemented method of any one of examples 1 to 9, wherein the selecting the second subset of candidate online content items comprises:
ranking the first subset of candidate online content items based on their corresponding recommendation scores; and
selecting the second subset of candidate online content items based on the ranking of the first subset of candidate online content items.

11. The computer-implemented method of any one of examples 1 to 10, wherein the causing the second subset of candidate online content items to be displayed comprises causing the second subset of candidate online content items to be displayed via at least one communication channel from a group of communication channels consisting of:
a personalized data feed for the target user;
a listing of search results on a search results page of an online service; and
an e-mail transmitted to the target user.

12. The computer-implemented method of any one of examples 1 to 11, further comprising:
receiving, by the computer system, an indication of a selection by the target user of a corresponding selectable user interface element for at least one of the second subset of candidate online content items;
storing, by the computer system, the indication of the selection by the target user of the corresponding selectable user interface element in a database of an online service; and
using, by the computer system, a machine learning algorithm to modify at least one of the baseline model, the user-based model, and the item-based model based on the stored indication of the selection by the target user of the corresponding selectable user interface element.

13. A system comprising:
at least one processor; and
a non-transitory computer-readable medium storing executable instructions that, when executed, cause the at least one processor to perform the method of any one of examples 1 to 12.

14. A non-transitory machine-readable storage medium, tangibly embodying a set of instructions that, when executed by at least one processor, causes the at least one processor to perform the method of any one of examples 1 to 12.

15. A machine-readable medium carrying a set of instructions that, when executed by at least one processor, causes the at least one processor to carry out the method of any one of examples 1 to 12.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof; show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:

for each one of a plurality of candidate online content items, generating, by a computer system having a memory and at least one hardware processor, a corresponding filter score based on a partial generalized linear mixed model comprising a baseline model and a user-based model, the baseline model being a generalized linear model based on feature data of the candidate online content item, the user-based model being a random effects model based on a history of online user actions by a target user directed towards reference online content items having feature data determined to be related to the feature data of the online candidate content items;

selecting, by the computer system, a first subset of candidate online content items from the plurality of candidate online content items based on the corresponding filter scores of the first subset;

for each one of the candidate online content items in the first subset, generating, by the computer system, a corresponding recommendation score based on a full generalized linear mixed model comprising the baseline model, the user-based model, and an item-based model, the item-based model being a random effects model based on a history of online user actions directed towards the candidate online content item by a plurality of reference users having profile information determined to be related to profile information of the target user;

selecting, by the computer system, a second subset of candidate online content items from the first subset based on the corresponding recommendation scores of the second subset; and causing, by the computer system, the second subset of candidate online content items to be displayed on a computing device of the target user.

2. The computer-implemented method of claim 1, wherein the plurality of candidate online content items comprises online job postings.

3. The computer-implemented method of claim 1, wherein the baseline model is a fixed effects model.

4. The computer-implemented method of claim 1, wherein the generalized linear model of the baseline model is further based on a comparison of profile information of the target user with the feature data of the candidate online content item.

5. The computer-implemented method of claim 1, wherein the generalized linear model of the baseline model is further based on a comparison of a search query received from the target user with the feature data of the candidate online content item.

6. The computer-implemented method of claim 1, wherein the profile information comprises one or more of at least one of skill, at least one interest, at least one industry, at least one employment history data, and at least one educational background data.

7. The computer-implemented method of claim 1, wherein the feature data comprises one or more of at least one skill, at least one interest, at least one industry, at least one employment history data, and at least one educational background data.

8. The computer-implemented method of claim 1, wherein:

the online user actions directed towards the reference online content items comprises at least one of selecting a user interface element indicating an interest by the target user in viewing the reference online content items, selecting a user interface element indicating an interest by the target user in saving the reference online content items, and selecting a user interface element indicating an interest by the target user in sending a message corresponding to the reference online content items; and the online user actions directed towards the candidate online content item comprises at least one of selecting a user interface element indicating an interest by the reference users in viewing the candidate online content item, selecting a user interface element indicating an interest by the reference users in saving the candidate online content item, and selecting a user interface element indicating an interest by the target user in sending a message corresponding to the reference online content item.

9. The computer-implemented method of claim 1, wherein the selecting the first subset of candidate online content items comprises:

selecting a portion of the plurality of candidate online content items based on the corresponding filter scores of the portion of the plurality of candidate online content items satisfying a threshold value;

ranking the selected portion of the plurality of candidate online content items based on their corresponding filter scores; and selecting the first subset of candidate online content items from the selected portion of the plurality of candidate online content items based on the ranking of the selected portion of the plurality of candidate online content items.

10. The computer-implemented method of claim 1, wherein the selecting the second subset of candidate online content items comprises:

ranking the first subset of candidate online content items based on their corresponding recommendation scores; and selecting the second subset of candidate online content items based on the ranking of the first subset of candidate online content items.

11. The computer-implemented method of claim 1, wherein the causing the second subset of candidate online content items to be displayed comprises causing the second subset of candidate online content items to be displayed via at least one communication channel from a group of communication channels consisting of:

a personalized data feed for the target user;

a listing of search results on a search results page of an online service; and an e-mail transmitted to the target user.

12. The computer-implemented method of claim 1, further comprising:

receiving, by the computer system, an indication of a selection by the target user of a corresponding selectable user interface element for at least one of the second subset of candidate online content items;

storing, by the computer system, the indication of the selection by the target user of the corresponding selectable user interface element in a database of an online service; and using, by the computer system, a machine learning algorithm to modify at least one of the baseline model, the user-based model, and the item-based model based on the stored indication of the selection by the target user of the corresponding selectable user interface element.

13. A system comprising:

at least one hardware processor; and a non-transitory machine-readable medium embodying a set of instructions that, when executed by the at least one hardware processor, cause the at least one processor to perform operations, the operations comprising:

for each one of a plurality of candidate online content items, generating a corresponding filter score based on a partial generalized linear mixed model comprising a baseline model and a user-based model, the baseline model being a generalized linear model based on feature data of the candidate online content item, the user-based model being a random effects model based on a history of online user actions by a target user directed towards reference online content items having feature data determined to be related to the feature data of the online candidate content items;

selecting a first subset of candidate online content items from the plurality of candidate online content items based on the corresponding filter scores of the first subset of candidate online content items;

for each one of the candidate online content items in the first subset, generating a corresponding recommendation score based on a full generalized linear mixed model comprising the baseline model, the user-based model, and an item-based model, the item-based model being a random effects model based on a history of online user actions directed towards the candidate online content item by a plurality of reference users having profile information determined to be related to profile information of the target user;

selecting a second subset of candidate online content items from the first subset of candidate online content items based on the corresponding recommendation scores of the second subset of candidate online content items; and causing the second subset of candidate online content items to be displayed on a computing device of the target user.

14. The system of claim 13, wherein the plurality of candidate online content items comprises online job postings.

15. The system of claim 13, wherein the baseline model is a fixed effects model.

16. The system of claim 13, wherein the profile information comprises one or more of at least one of skill, at least one interest, at least one industry, at least one employment history data, and at least one educational background data.

17. The system of claim 13, wherein the feature data comprises one or more of at least one skill, at least one interest, at least one industry, at least one employment history data, and at least one educational background data.

18. The system of claim 13, wherein:

the online user actions directed towards the reference online content items comprises at least one of selecting a user interface element indicating an interest by the target user in viewing the reference online content items, selecting a user interface element indicating an interest by the target user in saving the reference online content items, and selecting a user interface element indicating an interest by the target user in sending a message corresponding to the reference online content items; and the online user actions directed towards the candidate online content item comprises at least one of selecting a user interface element indicating an interest by the reference users in viewing the candidate online content item, selecting a user interface element indicating an interest by the reference users in saving the candidate online content item, and selecting a user interface element indicating an interest by the target user in sending a message corresponding to the reference online content item.

19. The system of claim 13, wherein the causing the second subset of candidate online content items to be displayed comprises causing the second subset of candidate online content items to be displayed via at least one communication channel from a group of communication channels consisting of:

a personalized data feed for the target user;

a listing of search results on a search results page of an online service; and an e-mail transmitted to the target user.

20. A non-transitory machine-readable medium embodying a set of instructions that, when executed by at least one hardware processor, cause the processor to perform operations, the operations comprising:

for each one of a plurality of candidate online content items, generating a corresponding filter score based on a partial generalized linear mixed model comprising a baseline model and a user-based model, the baseline model being a generalized linear model based on feature data of the candidate online content item, the user-based model being a random effects model based on a history of online user actions by the target user directed towards reference online content items having feature data determined to be related to the feature data of the online candidate content items;

selecting a first subset of candidate online content items from the plurality of candidate online content items based on the corresponding filter scores of the first subset;

for each one of the candidate online content items in the first subset, generating a corresponding recommendation score based on a full generalized linear mixed model comprising the baseline model, the user-based model, and an item-based model, the item-based model being a random effects model based on a history of online user actions directed towards the candidate online content item by a plurality of reference users having profile information determined to be related to profile information of the target user;

selecting a second subset of candidate online content items from the first subset based on the corresponding recommendation scores of the second subset; and causing the second subset of candidate online content ems to be displayed on a computing device of the target user.

\* \* \* \* \*

UNITED STATES PATENT AND TRADEMARK OFFICE
CERTIFICATE OF CORRECTION

PATENT NO. : 11,397,899 B2
APPLICATION NO. : 16/365050
DATED : July 26, 2022
INVENTOR(S) : Xue, et al.

It is certified that error appears in the above-identified patent and that said Letters Patent is hereby corrected as shown below:

In the Claims

In Column 27, Line 1, in Claim 20, delete "ems" and insert -- items -- therefor

Signed and Sealed this
Eleventh Day of October, 2022

Katherine Kelly Vidal
*Director of the United States Patent and Trademark Office*